(12) United States Patent
Matsushita

(10) Patent No.: US 11,620,002 B2
(45) Date of Patent: Apr. 4, 2023

(54) ELECTRONIC DEVICE

(71) Applicant: Panasonic Intellectual Property Management Co., Ltd., Osaka (JP)

(72) Inventor: Hisashi Matsushita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/886,518

(22) Filed: Aug. 12, 2022

(65) Prior Publication Data

US 2022/0391024 A1 Dec. 8, 2022

Related U.S. Application Data

(63) Continuation of application No. PCT/JP2021/003183, filed on Jan. 29, 2021.

(30) Foreign Application Priority Data

Feb. 21, 2020 (JP) .............................. JP2020-028268

(51) Int. Cl.
| | |
|---|---|
| G06F 21/57 | (2013.01) |
| G06F 3/023 | (2006.01) |
| G06F 9/4401 | (2018.01) |

(52) U.S. Cl.
CPC .......... *G06F 3/0238* (2013.01); *G06F 9/4401* (2013.01)

(58) Field of Classification Search
None
See application file for complete search history.

(56) References Cited

U.S. PATENT DOCUMENTS

| | | |
|---|---|---|
| 2004/0140967 A1 | 7/2004 | Kojo |
| 2007/0236464 A1 | 10/2007 | Kojo |
| | (Continued) | |

FOREIGN PATENT DOCUMENTS

| | | |
|---|---|---|
| JP | H08-067049 A | 3/1996 |
| JP | H11-161484 A | 6/1999 |
| | (Continued) | |

OTHER PUBLICATIONS

International Search Report for corresponding Application No. PCT/JP2021/003183, dated Mar. 30, 2021.

*Primary Examiner* — Carl Adams
(74) *Attorney, Agent, or Firm* — Renner, Otto, Boisselle & Sklar, LLP

(57) ABSTRACT

An electronic device includes: a processor; a first storage storing firmware to be executed by the processor when the electronic device is activated, and key code information defining a function of an operation button; a second storage reading the key code information and temporarily storing the key code information in a rewritable manner; and a keyboard controller assigning a key code to the operation button based on the key code information stored in the second storage. The processor determines whether the key code information stored in the second storage has been rewritten during setup of the firmware, and generates key code change information for changing a key code assigned to the operation button when the processor determines that the key code information has been rewritten. The keyboard controller changes a key code assigned to the operation button based on the key code change information during the setup of the firmware.

7 Claims, 12 Drawing Sheets

(56) References Cited

U.S. PATENT DOCUMENTS

2011/0314267 A1    12/2011   Watanabe et al.
2015/0067314 A1*    3/2015   Strauss ................ G06F 21/572
                                                    713/1

FOREIGN PATENT DOCUMENTS

| | | |
|---|---|---|
| JP | 2004-157712 A | 6/2004 |
| JP | 2012-003610 A | 1/2012 |
| JP | 2012-003620 A | 1/2012 |

\* cited by examiner

ELECTRONIC DEVICE

BACKGROUND

1. Technical Field

The present disclosure relates to an electronic device.

2. Description of the Related Art

A tablet electronic device having a display such as a liquid crystal display provided with operation buttons is known. For example, Patent Literature (PTL) 1 discloses an information processing device including a display unit having a plurality of key buttons arranged around a display panel.

The information processing device described in PTL 1 includes means for switching a function assigned to a key button according to an operation mode of a terminal. That is, the information processing device described in PTL 1 has, for example, a boot operation mode for executing a BIOS program and an operation mode used after an OS is activated. Functions can be assigned to the key buttons differently between these modes.

PTL 1 is Unexamined Japanese Patent Publication No. 2004-157712.

SUMMARY

The information processing device described in PTL 1 still has room for improvement in terms of improvement in operability.

An object of the present disclosure is to provide an electronic device with improved operability.

An electronic device according to the present disclosure has an operation button, the electronic device including: a processor; a first storage that stores firmware to be executed by the processor when the electronic device is activated, and key code information that defines a function of the operation button; a second storage that reads the key code information from the first storage and temporarily stores the key code information in a rewritable manner; and a keyboard controller that assigns a key code to the operation button based on the key code information stored in the second storage. The processor determines whether or not the key code information stored in the second storage has been rewritten during setup of the firmware, the processor generates key code change information for changing a key code assigned to the operation button when the processor determines that the key code information has been rewritten, and the keyboard controller changes a key code assigned to the operation button based on the key code change information during the setup of the firmware.

According to the present disclosure, an electronic device with improved operability can be provided.

Figure 1:
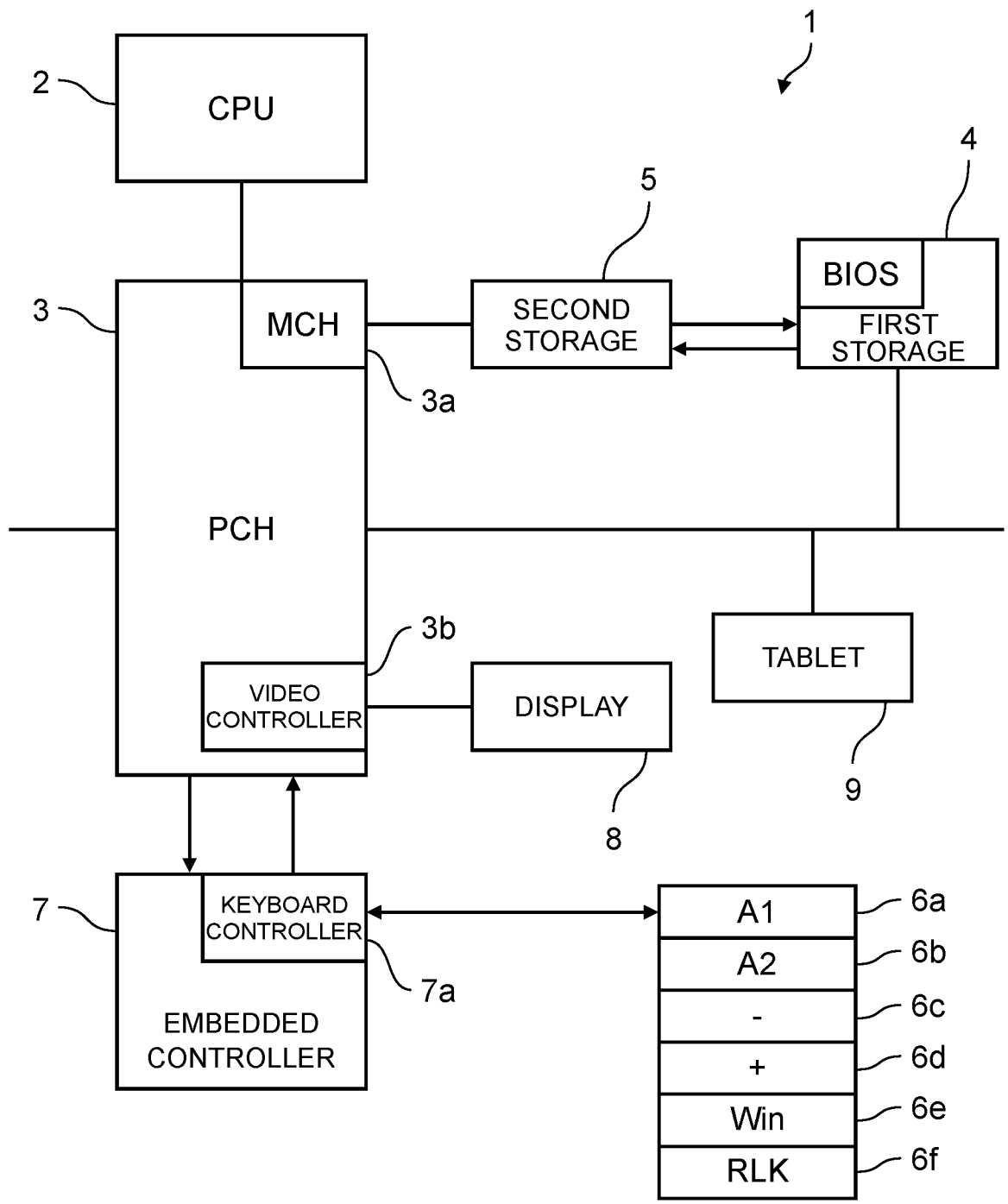
FIG. 1 is a block diagram illustrating an internal configuration of an electronic device according to a first exemplary embodiment of the present disclosure.

DETAILED DESCRIPTION (Background to the Present Disclosure)

In recent years, tablet PCs have become widespread. A tablet PC is provided with one or more operation buttons, and different functions are assigned to the operation buttons. For example, shortcut keys such as move cursor, change option, select, save set values, and exit are assigned to the buttons arranged on the tablet PC. The operation buttons can also be used for operations in BIOS setup.

However, such a tablet PC has a problem that changes cannot be made easily in the BIOS setup using the operation buttons. In the BIOS setup, in general, when various setting items are changed, the changed setting items are validated when the BIOS setup is activated next time after save and exit. This is because there are setting items such as hardware parameters that cannot be reflected until a CPU is reset.

Similarly, changes in assignment of the functions to the operation buttons are also reflected upon the next activation after save and exit. That is, even if the functions assigned to the operation buttons are changed, the changes are not reflected until the electronic device is restarted. Therefore, in order to improve the operability in BIOS setting, it is desirable to immediately reflect the assignment of the functions to the operation buttons without restart of the electronic device.

The inventor of the present invention has considered immediately reflecting the assignment of the functions to the operation buttons in BIOS setting without the restart of the electronic device, and have arrived at the following invention.

An electronic device according to one aspect of the present disclosure has an operation button, the electronic device including: a processor; a first storage that stores firmware to be executed by the processor when the electronic device is activated, and key code information that defines a function of the operation button; a second storage that reads the key code information from the first storage and temporarily stores the key code information in a rewritable manner; and a keyboard controller that assigns a key code to the operation button based on the key code information stored in the second storage. The processor determines whether or not the key code information stored in the second storage has been rewritten during setup of the firmware, the processor generates key code change information for changing a key code assigned to the operation button when the processor determines that the key code information has been rewritten, and the keyboard controller changes a key code assigned to the operation button based on the key code change information during the setup of the firmware.

According to this configuration, an electronic device with improved operability can be provided.

The electronic device may further include a display that displays a setup screen of the firmware. The key code information and the key code change information may be displayed on the display in a distinguishable manner.

According to this configuration, since the key code information and the key code change information are distinguishable, parts that have been changed can be easily recognized, and the operability is further improved.

The key code change information may be highlighted on the display.

According to this configuration, by highlighting the key code change information, the changed parts can be more easily recognized.

The processor may store the key code change information in the first storage.

According to this configuration, by storing the key code change information in the first storage, the changed key codes can be assigned to the operation buttons also when the electronic device is activated next time.

The key code information may include first key code information that defines a function of the operation button during the setup of the firmware, and second key code information that defines a function of the operation button during a time other than during the setup of the firmware, the keyboard controller may change a key code assigned to the operation button based on the second key code information when the electronic device is activated, and the keyboard controller may change a key code assigned to the operation button based on the first key code information when the setup of the firmware is started.

According to this configuration, it is possible to assign two sets of key code information, namely, the first key code information for during the setup and the second key code information for times other than during the setup to the operation buttons. As a result, it is possible to selectively use different functions of the operation buttons during setup and during other times, and this improves the operability.

The key code change information may include first key code change information generated when the first key code information is rewritten, and second key code change information generated when the second key code information is rewritten, and the processor may store the first key code change information in the first storage during the setup of the firmware, and store the second key code change information in the first storage after the setup of the firmware is exited.

According to this configuration, the first key code information that defines the functions of the operation buttons during the setup are changed during the setup, and the second key code information that defines the functions of the operation buttons during times other than during the setup are changed after the setup is exited. Therefore, for example, functions desired to be used during the setup can be assigned to the operation buttons, and other functions can be assigned during times other than during the setup. As a result, a number of operation buttons can be reduced.

The electronic device may be a tablet PC.

According to this configuration, it is possible to flexibly change the functions assigned to the operation buttons of a tablet PC with a small number of operation buttons, which improves the operability.

First Exemplary Embodiment

Figure 2:
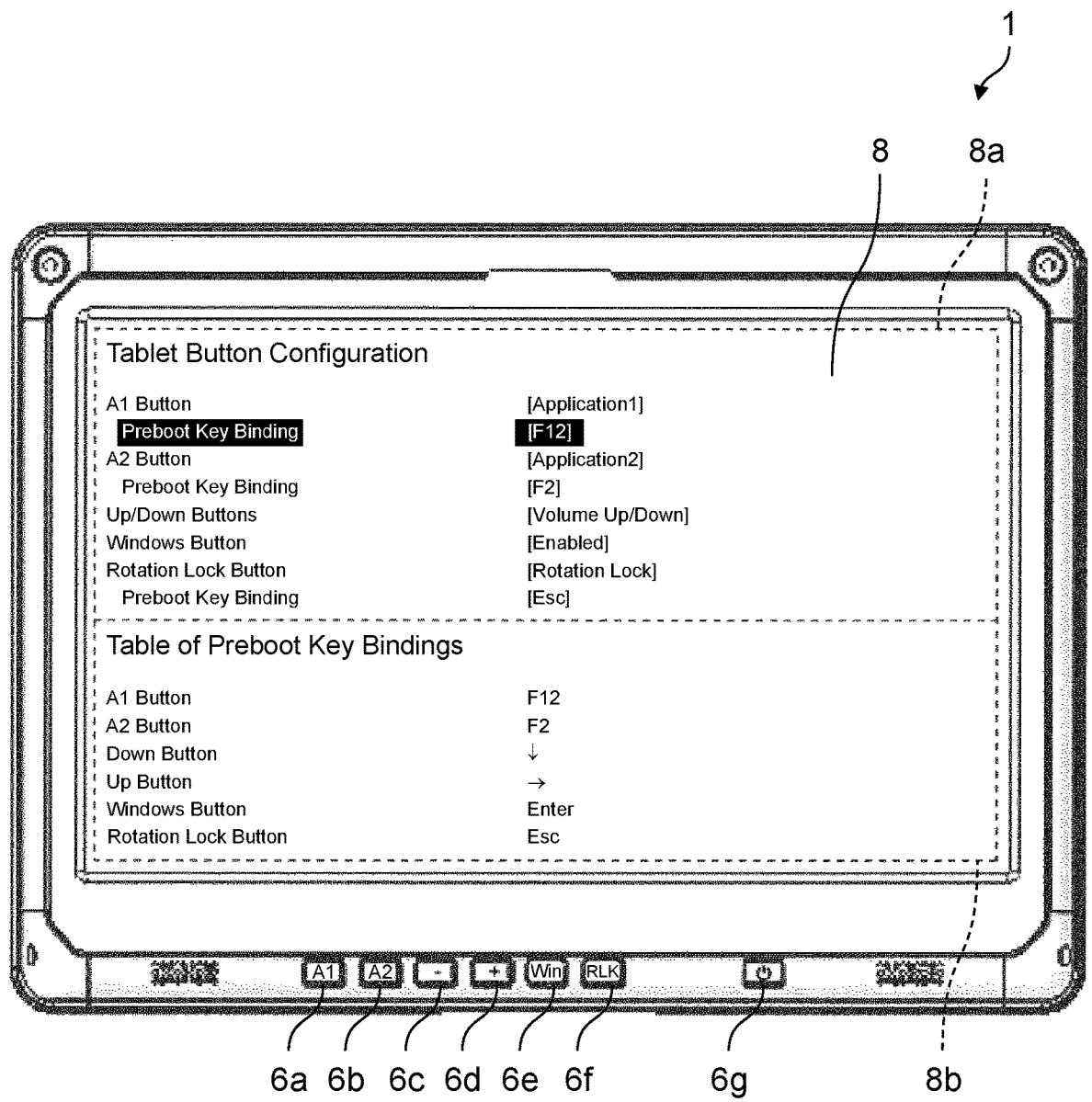
FIG. 2 is a schematic view illustrating an outer appearance and a BIOS setup screen of the electronic device of FIG. 1.
Figure 3:
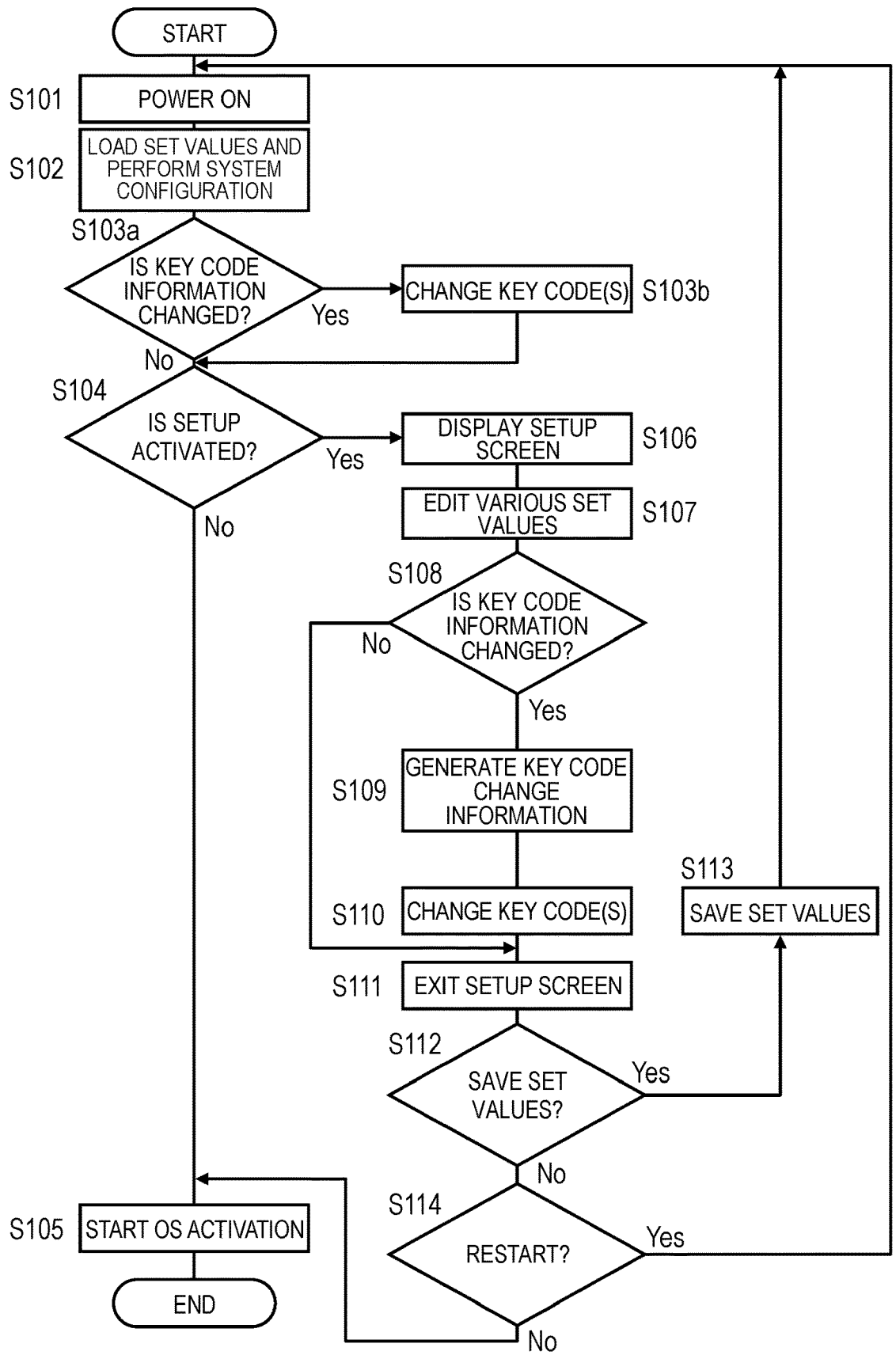
FIG. 3 is a flowchart illustrating an operation for changing key code information of the electronic device of FIG. 1.
Figure 4:
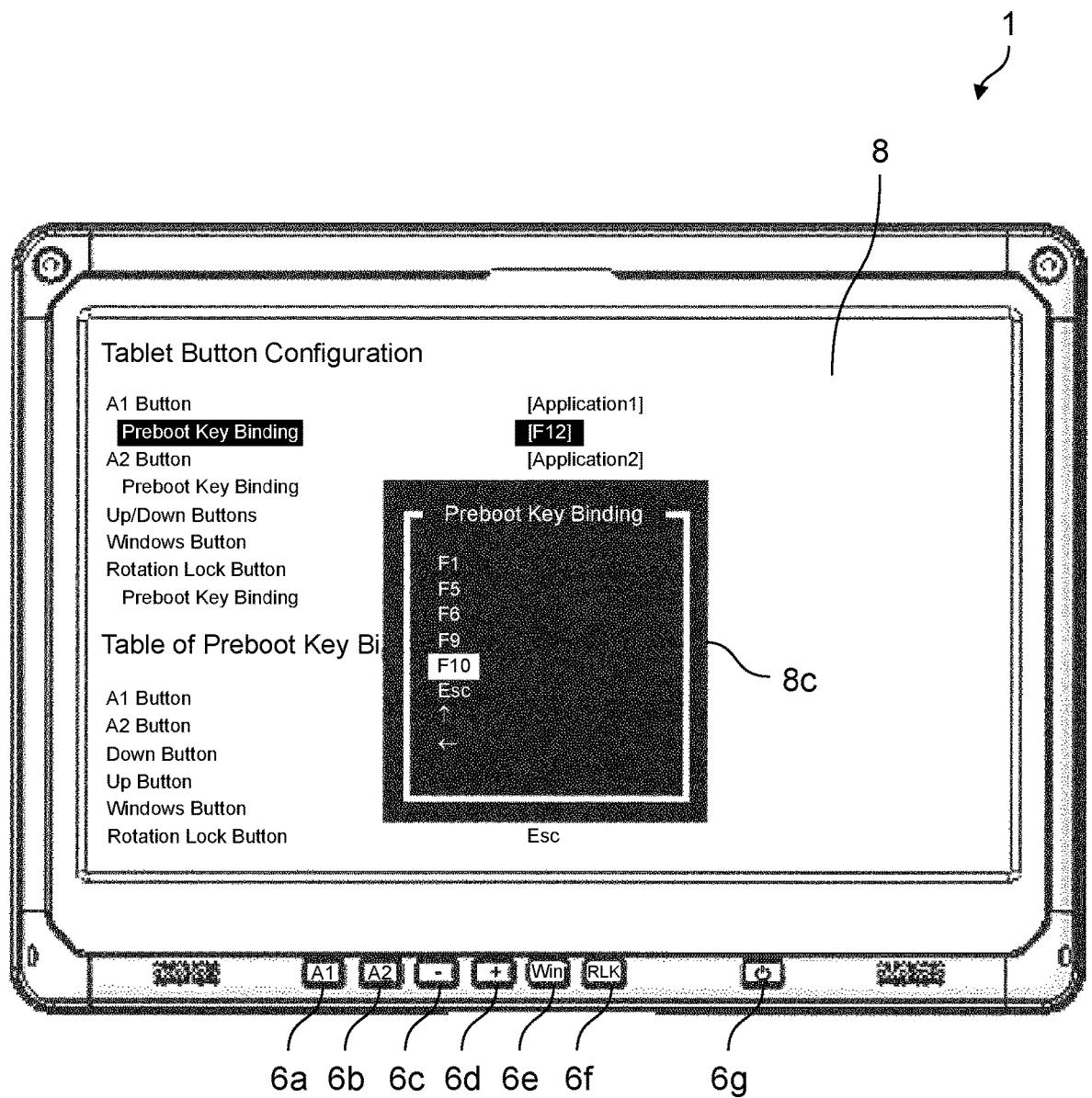
FIG. 4 is a schematic view of another BIOS setup screen of FIG. 2 when the key code information is changed.
Figure 5:
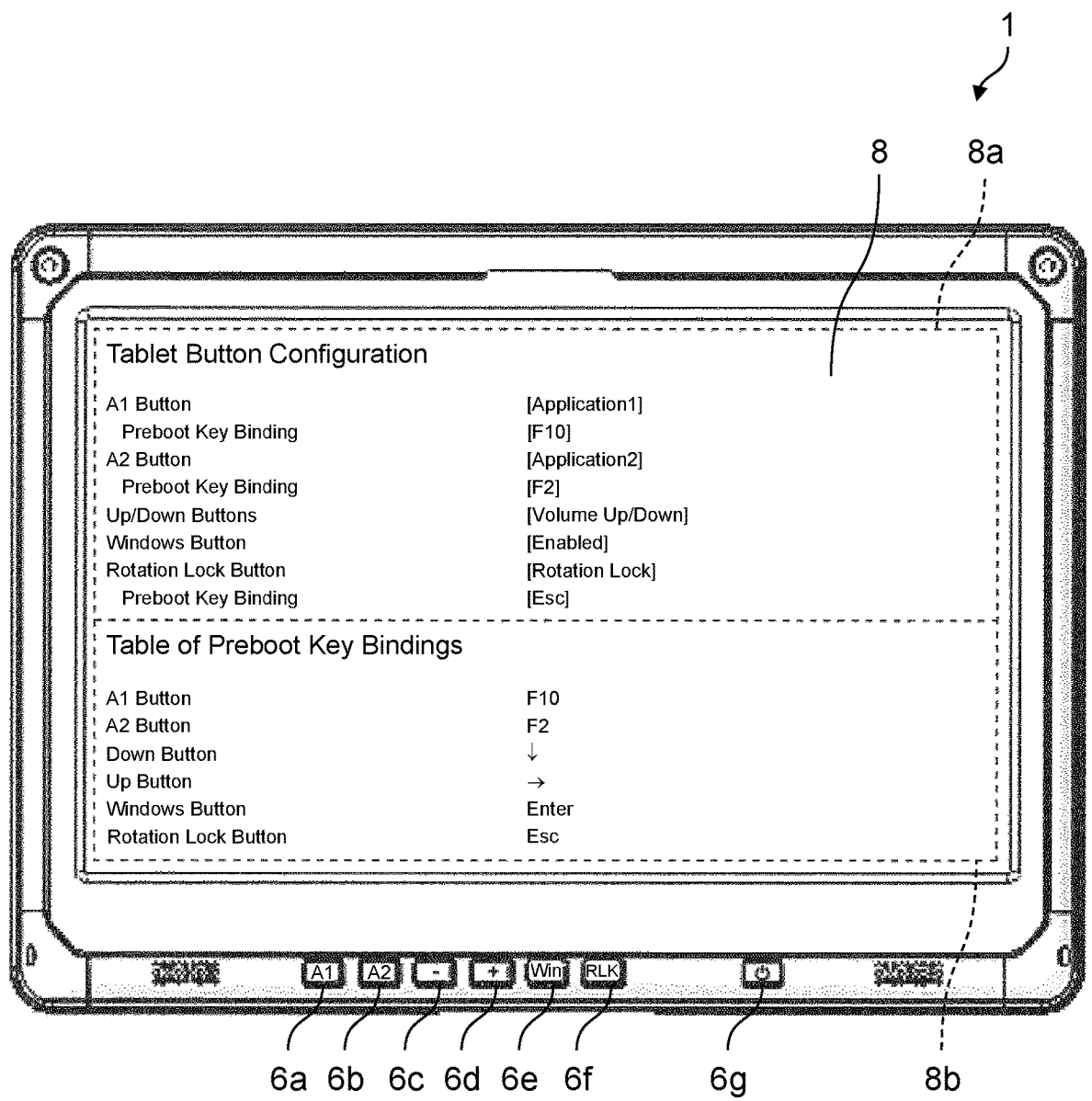
FIG. 5 is a schematic view of another BIOS setup screen of FIG. 2 displaying the changed key code information.

FIG. 1 is a block diagram illustrating an internal configuration of electronic device 1 according to a first exemplary embodiment of the present disclosure. FIG. 2 is a schematic view illustrating an outer appearance and a BIOS setup screen of electronic device 1 in FIG. 1. FIG. 3 is a flowchart illustrating an operation for changing key code information of electronic device 1 of FIG. 1. FIG. 4 is a schematic view of another BIOS setup screen of FIG. 2 when the key code information is changed. FIG. 5 is a schematic view of another BIOS setup screen of FIG. 2 displaying the changed key code information.

[General Configuration]

As illustrated in FIG. 1, electronic device 1 includes CPU 2, PCH 3, first storage 4, second storage 5, operation buttons 6a to 6f, embedded controller (EC) 7, display 8, and tablet 9. Display 8 and tablet 9 are not essential components. Display 8 is, for example, a liquid crystal display. CPU 2 corresponds to a "processor" of the present disclosure. Embedded controller 7 includes keyboard controller 7a.

As illustrated in FIG. 2, electronic device 1 is a tablet PC. As illustrated in FIG. 2, electronic device 1 includes display 8, six operation buttons 6a to 6f disposed adjacent to display 8, and power button 6g. Although not illustrated, electronic device 1 may include a microphone, a speaker, a camera, and/or the like.

<CPU>

Central processing unit (CPU) 2 is a central processing unit of electronic device 1, and manages system control of electronic device 1. CPU 2 executes, for example, an operating system (OS) loaded from a non-volatile memory (not illustrated) into the second storage, BIOS described later, or the like.

<PCH>

Platform controller hub (PCH) 3 serves to support a function of the CPU. In the present exemplary embodiment, PCH 3 includes memory controller hub (MCH) 3a and video controller 3b, and functions as an interface between CPU 2 and hardware such as the memory (second storage 5) or display 8.

MCH 3a functions as an interface that performs control such as reading data or the like stored in a main memory (second storage 5), or writing data.

Video controller 3b controls display of a video or an image on display 8 based on the data stored in the main memory.

<First Storage>

First storage 4 stores firmware executed by CPU 2 at a time electronic device 1 is activated and key code information that defines the functions of operation buttons 6a to 6f. First storage 4 is a non-transitory computer-readable storage medium, for example, a non-volatile memory such as a flash memory.

In the present exemplary embodiment, the basic input/output system (BIOS) is stored in first storage 4 as the firmware executed by CPU 2. The BIOS is software that executes initialization and control of input and output hardware. In addition, first storage 4 has a writable area and stores parameters of the input and output hardware set by the BIOS and the like. The key code information described later is also stored in first storage 4. Note that the firmware executed by CPU 2 is not limited to the BIOS, and it may be, for example, a unified extensible firmware interface (UEFI) or the like.

<Second Storage>

Second storage 5 reads the key code information from first storage 4 and temporarily saves the key code information in a rewritable manner. Second storage 5 is a temporary computer-readable storage medium, for example, a volatile memory such as a DRAM. CPU 2 can load data, a program, or the like stored in first storage 4 into second storage 5, access the data or the like loaded into second storage 5, and execute the BIOS, another application, or the like.

<Operation Buttons>

In the present exemplary embodiment, electronic device 1 includes six operation buttons 6a to 6f. A number of operation buttons is not limited to six, and may be one or more. As illustrated in FIG. 2, operation buttons 6a to 6f are arranged adjacent to display 8 in the present exemplary embodiment. However, positions at which operation buttons 6a to 6f are arranged are not limited thereto. For example, they may be arranged on one or more side faces of electronic device 1. In the present exemplary embodiment, power button 6g is disposed in addition to operation buttons 6a to 6f. However, power button 6g is not an essential component, and for example, operation buttons 6a to 6f may offer a function of power button 6g.

As illustrated in FIGS. 1 and 2, in the present exemplary embodiment, operation button 6a is labeled with "A1", operation button 6b is labeled with "A2", operation button 6c is labeled with "−", operation button 6d is labeled with "+", operation button 6e is labeled with "Win", and operation button 6f is labeled with "RLK". The labels attached to operation buttons 6a to 6f are not limited thereto, and may be, for example, graphics such as icons.

Different functions can be assigned to the respective operation buttons. In the present exemplary embodiment, for example, the functions assigned operation buttons 6a and 6b are different for each application executed on the OS. Operation buttons 6c and 6d are assigned, for example, functions of increasing and decreasing volume of sound or moving a cursor. For example, a menu display function is assigned to operation button 6e. For example, a rotation lock function for display 8 of electronic device 1 is assigned to operation button 6f. The functions assigned to operation buttons 6a to 6f described above are merely examples and are not limited thereto.

In addition, functions of operation buttons 6a to 6f in a period from power-on of electronic device 1 to activation of the OS, their functions in the BIOS setup, and their functions in an application executed on the OS may be different.

Respective preboot key bindings are assigned to operation buttons 6a to 6f. The preboot key bindings define, for each of operation buttons 6a to 6f, a function assigned thereto in the period from the power-on of electronic device 1 to the activation of the OS and a function assigned thereto in the BIOS setup. The preboot key bindings assign key codes to operation buttons 6a to 6f. For example, the preboot key bindings assign, for each of operation buttons 6a to 6f, a key code for a function key, a direction key (down key, up key, left key, right key), an enter key, or an escape key.

Example functions of function keys in the period from the power-on of electronic device 1 to the activation of the OS include "BIOS setup activation" of F2 key and "network boot" of F12 key. Example functions of the function keys in the BIOS setup include "help" of F1 key, "volume change" of F5 key and F6 key, "default setting" of F9 key, and "save and restart" of F10 key.

In the first exemplary embodiment, the same key codes set by the preboot key bindings are used in determining the functions assigned to operation buttons 6a to 6f in the period from the power-on of electronic device 1 to the activation of the OS and in determining the functions assigned to operation buttons 6a to 6f in the BIOS setup. Therefore, when the key codes of the preboot key bindings are changed, both the functions assigned to operation buttons 6a to 6f in the period from the power-on of electronic device 1 to the activation of the OS and the functions assigned to operation buttons 6a to 6f in the BIOS setup are changed.

For example, a case where the preboot key bindings assign key codes for F12 key, F2 key, down key, right key, enter key, and escape key to operation buttons 6a to 6f, respectively, will be described. In this case, the functions of operation buttons 6a to 6f in the period from the power-on of electronic device 1 to the activation of the OS are "network boot", "BIOS setup activation", "move cursor down", "move cursor right", "Enter", and "Esc", respectively. On the other hand, the functions of the F12 key and F2 key are not set for operation buttons 6a and 6b in the BIOS setup. Therefore, the functions of operation buttons 6a to 6f in BIOS setup are "no operation", "no operation", "move cursor down", "move cursor right", "Enter", and "Esc", respectively.

As illustrated in FIG. 2, a list of preboot key bindings is displayed in key binding list 8b on the BIOS setup screen displayed on display 8. Note that the preboot key bindings assigned to operation buttons 6a to 6f correspond to the "key code information" of the present disclosure.

Key codes that can be changed in the BIOS setup are displayed in operation button configuration list 8a displayed on display 8. In the present exemplary embodiment, in the BIOS setup, the key codes for operation button 6a (A1 Button), operation button 6b (A2 Button), and operation button 6f (Rotation Lock Button) can be changed. Further, assignment of functions to operation buttons 6a to 6f for after the activation of the OS can also be performed in the BIOS setup.

As illustrated in FIG. 2, as the preboot key bindings, a key code for "F12" is assigned to operation button 6a, a key code for "F2" is assigned to operation button 6b, and a key code for "Esc" is assigned to operation button 6f. "F12" has a function of network boot, "F2" has a function of activating the BIOS setup, and "Esc" has a function of exiting a submenu. In addition, key codes used in the BIOS setup include key codes such as "F10 (save and exit)" and "F9 (read default settings)", and these key codes can be assigned to operation buttons 6a, 6b, and 6f. This makes it possible to assign functions to operation buttons 6a, 6b, 6f in the BIOS setup.

A key code for "down key" is assigned to operation button 6c (Down Button), a key code for "right key" is assigned to operation button 6d (Up Button), and a key code for "enter key" is assigned to operation button 6e (Windows Button). The "down key" has a function of moving the cursor down, the "right key" has a function of moving the cursor right, and the "enter key" has a function of selecting an item or moving to a submenu. In the present exemplary embodiment, the key codes assigned to these operation buttons 6c, 6d, and 6e cannot be changed. Since the functions of cursor movement (the down key and right key) and item selection (the enter key) are often used, they are assigned in a fixed manner.

When the key code information for operation buttons 6a, 6b, and 6f is changed, CPU 2 generates key code change information. The key code change information is displayed together with the key code information in key binding list 8b on the BIOS setup screen displayed on display 8.

<Embedded Controller (EC)>

Embedded controller (EC) 7 is a microcontroller that receives operation of operation buttons 6a to 6f and power button 6g, and transmits operation information to CPU 2 via PCH 3. EC 7 includes keyboard controller 7a. When the key code information loaded in second storage 5 is changed during the BIOS setup, CPU 2 generates the key code change information and sends it to keyboard controller 7a. Keyboard controller 7a changes the assignment of key codes to operation buttons 6a to 6f based on the key code change information. The key code change information is information for changing the assignment of key codes to operation buttons 6a to 6f.

[Operation]

An operation for changing the key code information in the BIOS setup of electronic device 1 according to the present exemplary embodiment will be described with reference to FIG. 3.

Power button 6g (see FIG. 2) of electronic device 1 is pressed to power on electronic device 1 (step S101). When electronic device 1 is powered on, CPU 2 loads various parameters and the like set by the BIOS from first storage 4 into second storage 5. CPU 2 executes the system configuration of electronic device 1 based on the loaded parameters (step S102). After that, CPU 2 determines whether or not there is a change in the key code information (step S103a). When there is a change in the key code information (Yes in step S103a), one or more of the key codes assigned to operation buttons 6a to 6f are changed by keyboard controller 7a (step S103b). When there is no change in the key code information (No in step S103a), the process proceeds to step S104.

CPU 2 determines whether the BIOS setup is activated (step S104). The BIOS setup is activated when, for example, the "F2" key is pressed immediately after power button 6g of electronic device 1 is pressed. In the present exemplary embodiment, since the key code for "F2" is assigned to operation button 6b, when operation button 6b is pressed after the power-on of electronic device 1 and before the activation of the OS, the BIOS setup is activated. When the BIOS setup is not activated (No in step S104), subsequently, the OS is activated (step S105).

When the BIOS setup is activated (Yes in step S104), the BIOS setup screen is displayed on display 8 of electronic device 1 by video controller 3b (step S106). On the BIOS setup screen, a user can change settings of various parameters (step S107). The settings of the various parameters changed by the user are rewritten in second storage 5.

The configuration of the various parameters in step S107 includes changing the key code information (the preboot key bindings). For example, as illustrated in FIG. 4, when the preboot key binding for operation button 6a is selected, pop-up screen 8c is displayed that displays a list of key codes that can be assigned to operation button 6a. Here, for example, when "F10" is selected, the preboot key binding for operation button 6a is changed. When the preboot key binding for operation button 6a is changed, the display of the assignment of the preboot key binding for operation button 6a is changed to "F10" as illustrated in FIG. 5.

CPU 2 determines whether or not the key code information stored in second storage 5 has been rewritten (step S108). When CPU 2 determines that the key code information has been rewritten (Yes in step S108), CPU 2 generates the key code change information for changing one or more of the key codes assigned to operation buttons 6a to 6f (step S109). The key code change information may be stored in second storage 5, for example. As illustrated in FIG. 5, the key code change information is displayed in key binding list 8b on the BIOS setup screen displayed on display 8.

CPU 2 transmits the key code change information to keyboard controller 7a. Subsequently, keyboard controller 7a changes the key codes assigned to operation buttons 6a to 6f based on the key code change information (step S110). At this time, even if it is during the BIOS setup, the key codes assigned to operation buttons 6a to 6f are changed. That is, the key code assigned to operation button 6a is changed from "F12" to "F10" during the BIOS setup. This means that "save and exit" can be executed when operation button 6a is operated during the BIOS setup.

The BIOS setup is exited by the user's operation (step S111). In step S108, when CPU 2 determines that the key code information has not been rewritten (No in step S108), steps S109 to S110 are skipped.

When the BIOS setup is exited, CPU 2 determines whether or not to save the various parameters edited in the BIOS setup (step S112). Whether or not to save the various parameters can be selected by the user when the BIOS setup is exited. In a case where the user selects "save and exit" in the BIOS setup, for example, CPU 2 decides to save the various parameters.

In a case where the various parameters are saved (Yes in step S112), the changed parameters are read from second storage 5 and written in first storage 4 by CPU 2 (step S113). After that, electronic device 1 is restarted. When the various parameters are not saved (No in step S112), CPU 2 determines whether to restart electronic device 1 (step S114). Whether to restart electronic device 1 is determined based on the user's operation. When restart is performed (Yes in step S114), electronic device 1 is restarted. When restart is not performed (No in step S114), the process proceeds to step S105, and the activation of the OS is started. In a case where the various parameters are not saved, the key code change information generated in step S109 is discarded, and, at the time of the next activation, the key codes are assigned to operation buttons 6a to 6f based on the key code information before being changed.

As described above, the various parameters changed in the BIOS setup are saved (stored) in first storage 4 after the BIOS setup screen is exited, and the parameters changed by the restart of electronic device 1 are loaded into second storage 5. That is, the various parameters changed in the BIOS setup are validated when electronic device 1 is restarted. On the other hand, in the present exemplary embodiment, changes in the assignment of the key codes to operation buttons 6a to 6f are validated during the BIOS setup without the restart of electronic device 1. Therefore, the key codes can be flexibly changed during the BIOS setup, and the user operability can be improved.

[Effects]

According to the above-described exemplary embodiment, electronic device 1 with improved operability can be provided. The assignment of the key codes to operation buttons 6a to 6f changed during the BIOS setup can be reflected without electronic device 1 being restarted. For example, the key code "F2" assigned to operation button 6b has a function of activating the BIOS setup, but is not used during the BIOS setup. In the above-described exemplary embodiment, after the BIOS setup is activated, the key code for operation button 6b can be changed to "F10 (save and exit)", and this change can be immediately reflected. In this way, since the function for operation button 6b can be immediately reflected, the user operability can be improved.

Since there is no need to reset the CPU to change the assignment of the functions to the operation buttons unlike the setting of the hardware parameters and the like in the BIOS setting, the changes can be immediately reflected without the CPU being restarted, and the user operability can be improved.

In addition, as described above, when the assignment of the key codes to operation buttons 6a to 6f can be flexibly changed, it is possible to assign functions to operation buttons that have not been used in the BIOS setup. This allows a number of operation buttons arranged on an outer appearance of electronic device 1 to be reduced. In particular, in a case of a tablet PC, since its design can be improved when the number of operation buttons is small, it can be aesthetically improved.

By storing the key code change information in first storage 4 after the BIOS setup is exited, the changed key codes can be assigned to operation buttons 6a to 6f also when electronic device 1 is activated next time.

Second Exemplary Embodiment

A second exemplary embodiment will be described with reference to FIGS. 6 to 8. In the second exemplary embodiment, the same or equivalent configurations as those in the first exemplary embodiment are denoted by the same reference numerals as those in the first exemplary embodiment. The description already given for the first exemplary embodiment is omitted for the second exemplary embodiment.

Figure 6:
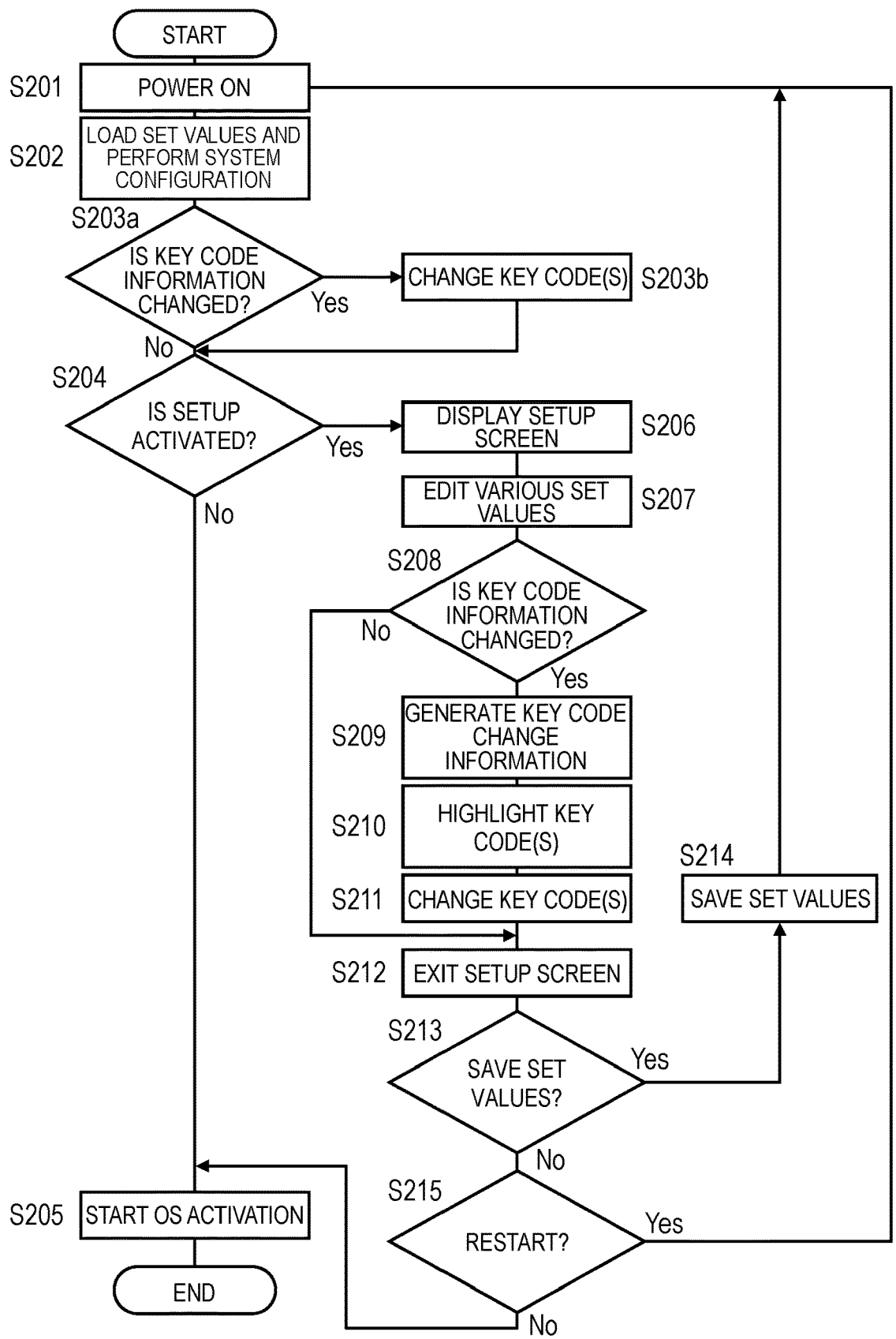
FIG. 6 is a flowchart illustrating an operation for changing the key code information according to a second exemplary embodiment of the electronic device of FIG. 1.

FIG. 6 is a flowchart illustrating an operation for changing the key code information according to the second exemplary embodiment of electronic device 1 of FIG. 1. FIG. 7 is a schematic view illustrating an example display of a BIOS setup screen according to the second exemplary embodiment of electronic device 1 in FIG. 1. FIG. 8 is a schematic view illustrating another example display of the BIOS setup screen of FIG. 7.

The second exemplary embodiment is different from the first exemplary embodiment in that the key code change information is highlighted in the key code list on the BIOS setup screen displayed on display 8.

The operation for changing the key code information of electronic device 1 according to the present exemplary embodiment will be described with reference to FIG. 6. Steps S201 to S209 in FIG. 6 are the same as steps S101 to S109 of the first exemplary embodiment. Steps S211 to S215 in FIG. 6 are the same as steps S110 to S114 of the first exemplary embodiment. Therefore, detailed description thereof will be omitted.

When CPU 2 generates the key code change information (step S209), CPU 2 highlights the key code change information on display 8 (step S210). That is, the key code information and the key code change information are displayed on display 8 in a distinguishable manner.

Figure 7:
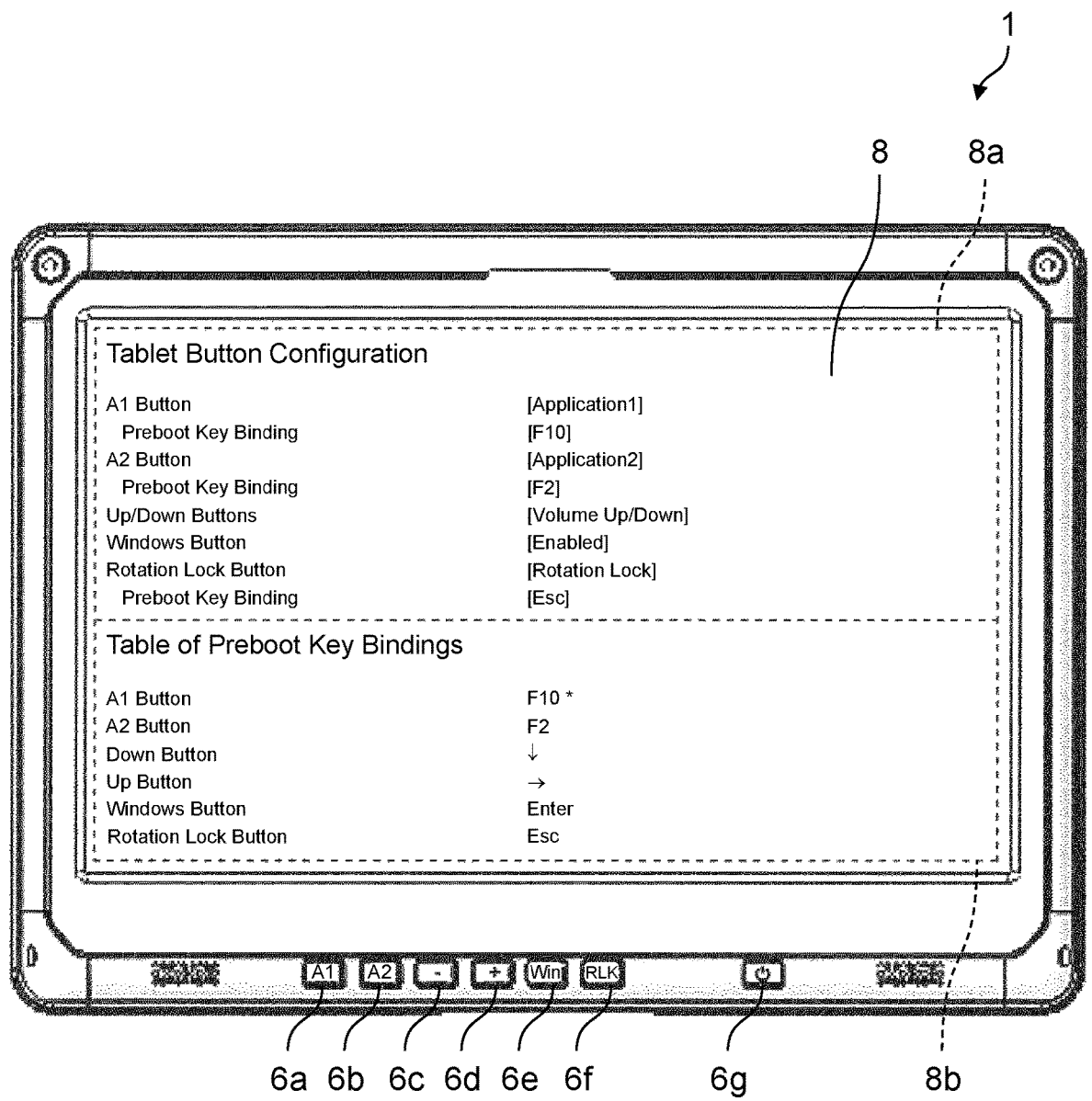
FIG. 7 is a schematic view illustrating an example display of a BIOS setup screen according to the second exemplary embodiment of the electronic device of FIG. 1.
Figure 8:
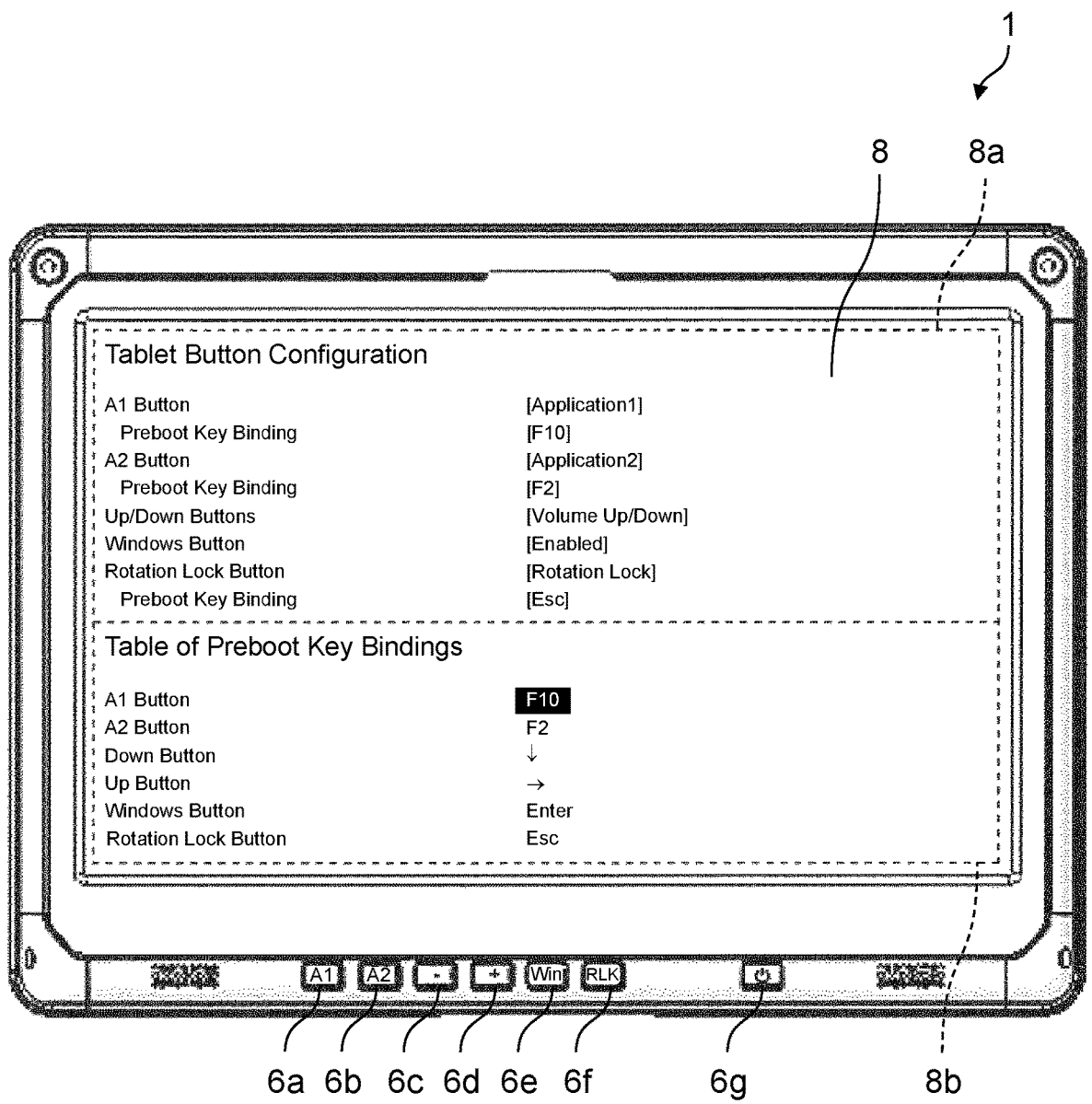
FIG. 8 is a schematic view illustrating another example display of the BIOS setup screen of FIG. 7.

As illustrated in FIGS. 2 and 7, the key code assigned to operation button 6a (A1 Button) has been changed from "F12" to "F10". At this time, the key code assigned to operation button 6a is displayed as "F10*" in key binding list 8b on the BIOS setup screen displayed on display 8. That is, a changed part is marked with an asterisk to emphasize the change. Highlighting is not limited thereto, and for example, as illustrated in FIG. 8, a color of characters may be inverted. Highlighting can be done in any way as long as changes can be easily recognized, such as changing the color of characters, changing a font of the characters, or making the characters bold.

[Effects]

According to the above-described exemplary embodiment, the key code information and the key code change information are displayed on the display in a distinguishable manner, and further, the key code change information is highlighted so that the user can easily recognize the changes made in the key code information.

Third Exemplary Embodiment

Figure 10:
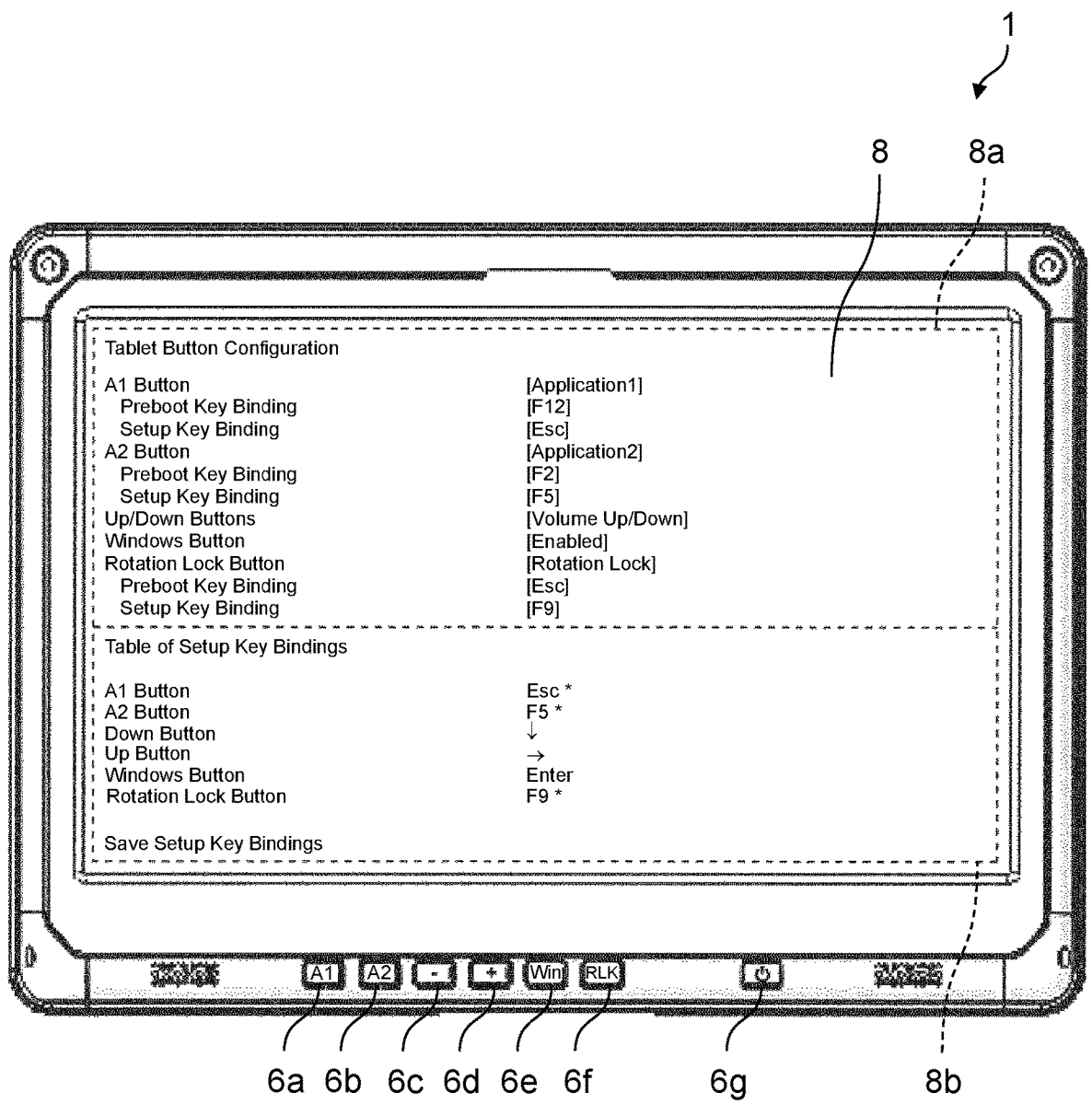
FIG. 10 is a schematic view illustrating an example display of a BIOS setup screen according to the third exemplary embodiment of the electronic device of FIG. 1.
Figure 11:
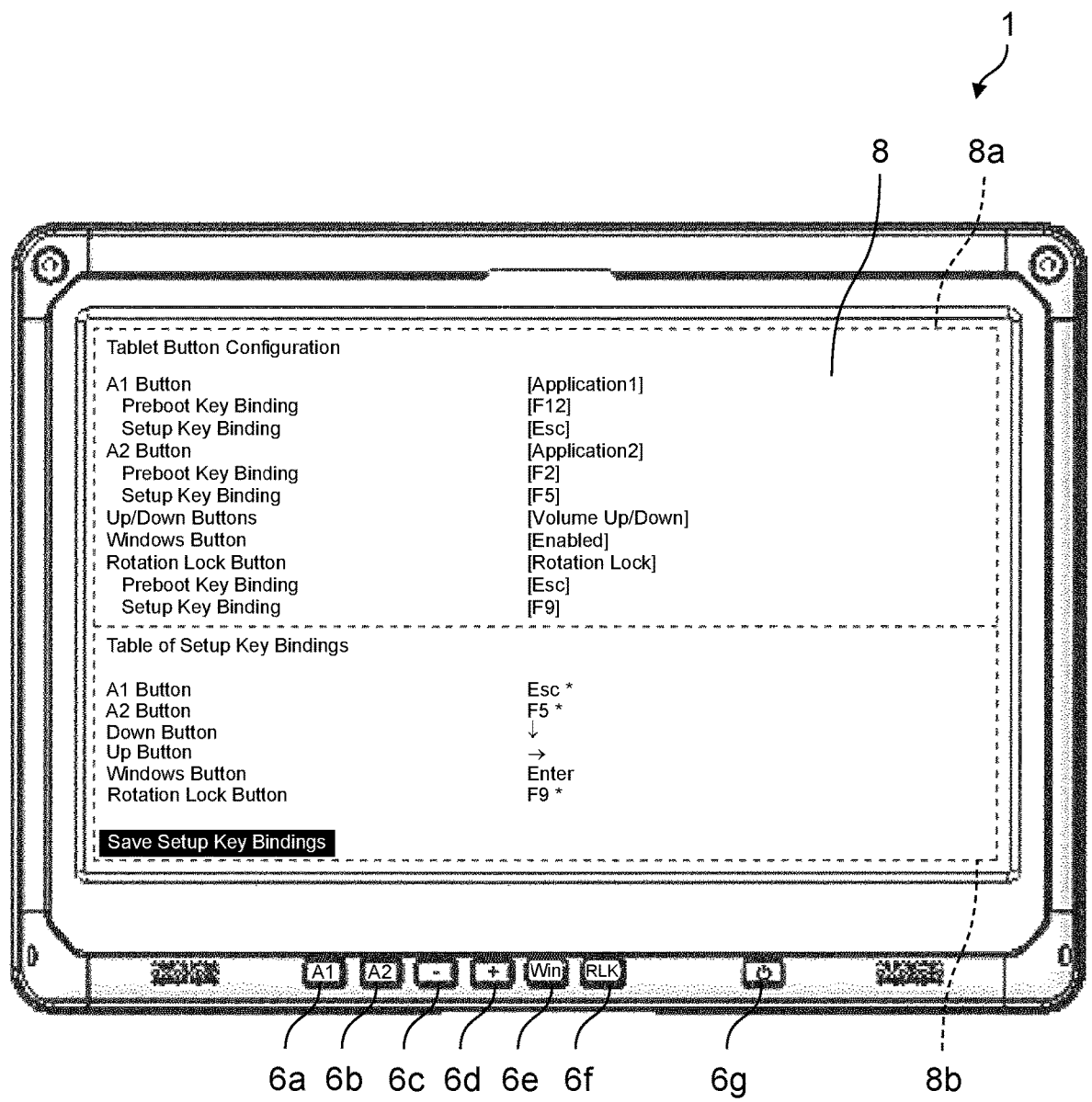
FIG. 11 is a schematic view illustrating another example display of the BIOS setup screen of FIG. 10.

A third exemplary embodiment will be described with reference to FIGS. 9 to 11. In the third exemplary embodiment, the same or equivalent configurations as those in the first and second exemplary embodiments are denoted by the same reference numerals as those in the first and second exemplary embodiments. The description already given for the first and second exemplary embodiments is omitted for the third exemplary embodiment.

Figure 9:
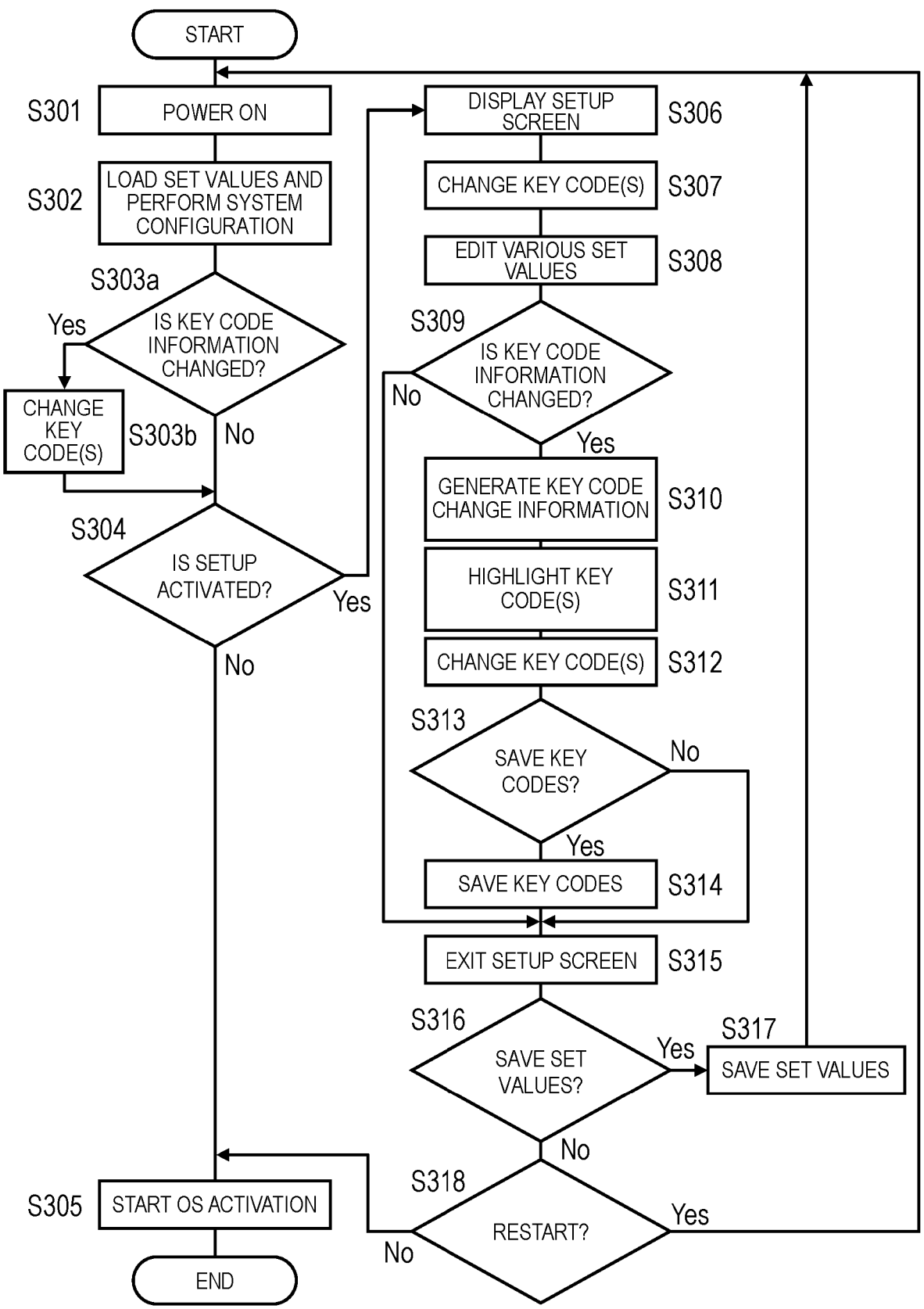
FIG. 9 is a flowchart illustrating an operation for changing the key code information according to a third exemplary embodiment of the electronic device of FIG. 1.
Figure 12:
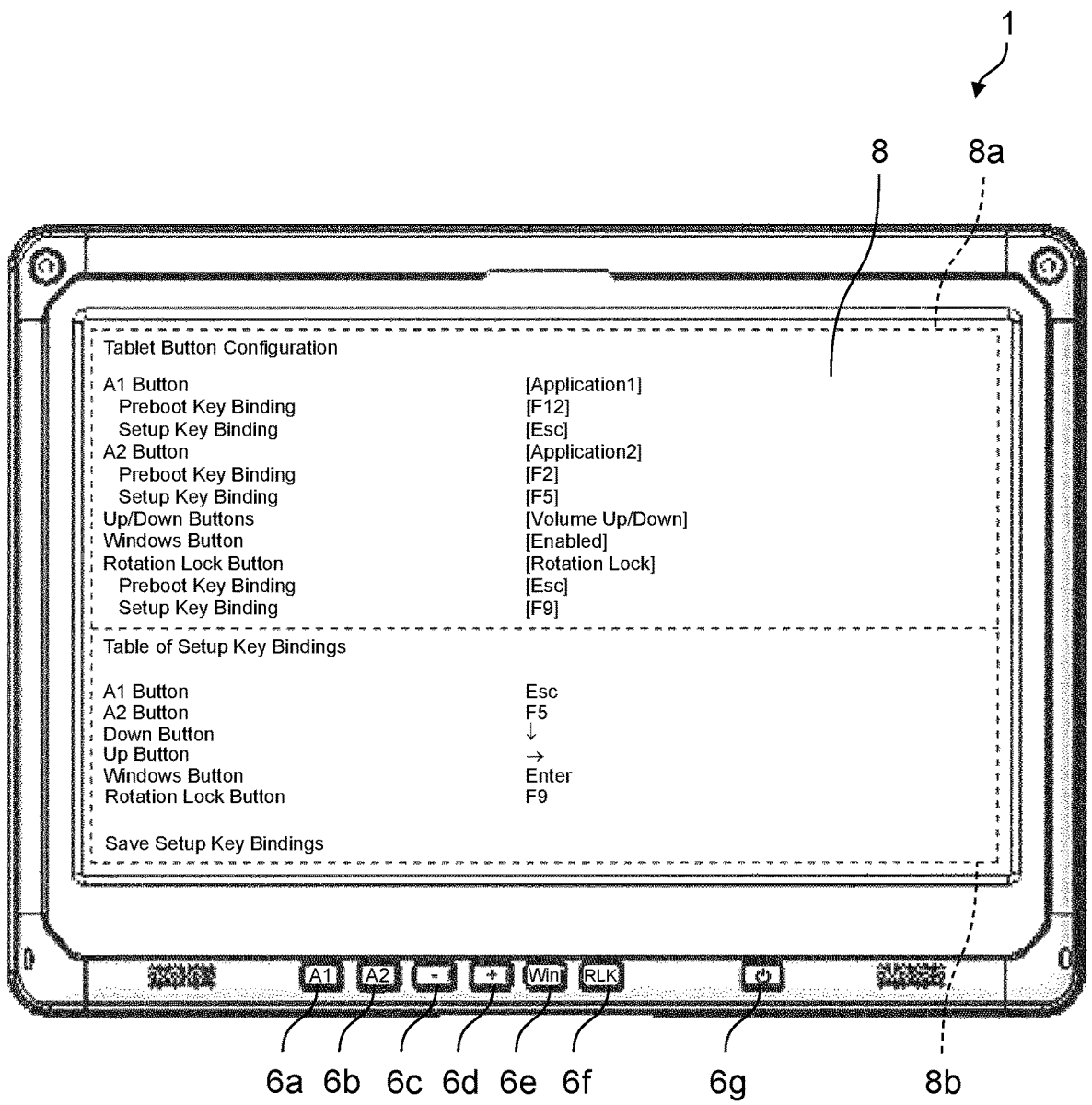
FIG. 12 is a schematic view illustrating another example display of the BIOS setup screen of FIG. 10.

FIG. 9 is a flowchart illustrating an operation for changing the key code information according to the third exemplary embodiment of electronic device 1 of FIG. 1. FIG. 10 is a schematic view illustrating an example display of a BIOS setup screen according to the third exemplary embodiment of electronic device 1 in FIG. 1. FIG. 11 is a schematic view illustrating another example display of the BIOS setup screen of FIG. 10. FIG. 12 is a schematic view illustrating another example display of the BIOS setup screen of FIG. 10.

The third exemplary embodiment is different from the first and second exemplary embodiments in that the key code information that defines the functions of operation buttons 6a to 6f includes preboot key bindings and setup key bindings. The setup key bindings correspond to "first key code information" of the present disclosure, and the preboot key bindings correspond to "second key code information" of the present disclosure.

The setup key bindings of the present exemplary embodiment refer to key code information assigned to operation buttons 6a to 6f in the BIOS setup. That is, the setup key bindings define the functions assigned to operation buttons 6a to 6f in the BIOS setup. The preboot key bindings of the present exemplary embodiment refer to, among the preboot key bindings described in connection to the first and second exemplary embodiments, key code information assigned to operation buttons 6a to 6f during times other than during the BIOS setup. That is, the preboot key bindings define the functions assigned to operation buttons 6a to 6f in the period from the power-on of electronic device 1 to the activation of the OS. The preboot key bindings are not used during the BIOS setup.

As described above, the key code information includes the setup key bindings (first key code information) and the preboot key bindings (second key code information). This makes it possible to change the key codes assigned to operation buttons 6a to 6f between during the BIOS setup and other times.

To be more specific, in the first and second exemplary embodiments, the same key codes set by the preboot key bindings are used in determining the functions assigned to operation buttons 6a to 6f in the period from the power-on of electronic device 1 to the activation of the OS and in determining the functions assigned to operation buttons 6a to 6f in BIOS setup. Therefore, when the key codes of the preboot key bindings are changed, both the functions assigned to operation buttons 6a to 6f in the period from the power-on of electronic device 1 to the activation of the OS and the functions assigned to operation buttons 6a to 6f in the BIOS setup are changed. On the other hand, in the present exemplary embodiment, the key codes assigned to operation buttons 6a to 6f in the BIOS setup do not use the key codes assigned by the preboot key bindings, but uses the key codes assigned by the setup key bindings. This makes it possible to separately set the functions assigned to operation buttons 6a to 6f in the period from the power-on of electronic device 1 to the activation of the OS and the functions assigned to operation buttons 6a to 6f in the BIOS.

An operation for changing the key code information of electronic device 1 according to the present exemplary embodiment will be described with reference to FIG. 9. Steps S301 to S302 in FIG. 9 are the same as steps S201 to S202 of the second exemplary embodiment.

CPU 2 loads set values and executes system configuration (step S302). After that, CPU 2 determines whether or not the key code information has been changed (step S303a). Next, the key codes assigned to operation buttons 6a to 6f are changed by keyboard controller 7a based on the preboot key bindings (second key code information) loaded into second storage 5 (step S303b). That is, when electronic device 1 is activated, keyboard controller 7a changes the key codes assigned to operation buttons 6a to 6f based on the second key code information.

Steps S304 to S306 in FIG. 9 are the same as steps S204 to S206 of the second exemplary embodiment. Once the BIOS setup screen is displayed on display 8 (step S306), the key codes assigned to operation buttons 6a to 6f are changed by keyboard controller 7a based on the setup key bindings (first key code information) loaded into second storage 5 (step S307). That is, when setup of the firmware (BIOS) is started, keyboard controller 7a changes the key codes assigned to operation buttons 6a to 6f based on the first key code information.

In the present exemplary embodiment, the key code information includes the first key code information (setup key bindings) and the second key code information (preboot key bindings). The first key code information defines the functions of operation buttons 6a to 6f during the firmware (BIOS) setup. The second key code information defines the functions of operation buttons 6a to 6f during times other than during the firmware setup.

Because the first key code information defines the functions of operation buttons 6a to 6f during the BIOS setup, the key codes are assigned after activation of the BIOS setup (after step S306) based on the first key code information. After the BIOS setup is activated, the user can edit various parameters (step S308). The various parameters include the first key code information and the second key code information.

CPU 2 determines whether or not the first key code information and the second key code information stored in second storage 5 have been rewritten (step S309). When CPU 2 determines that the first key code information and the second key code information have been rewritten (Yes in step S309), CPU 2 generates first key code change information and second key code change information, and stores the first key code change information and the second key code change information in second storage 5 (step S310). The first key code change information is generated when the first key code information is rewritten, and the second key code change information is generated when the second key code is rewritten.

Subsequently, CPU 2 highlights the first key code change information in key binding list 8b on the BIOS setup screen of display 8 (step S312). As illustrated in FIG. 10, highlighting can be performed by adding asterisks to parts that have been changed. In an example of FIG. 10, operation button 6a (A1 Button), operation button 6b (A2 Button), and operation button 6f (Rotation Lock Button) are highlighted because they have been changed. The example of FIG. 10 indicates that the first key code information of operation buttons 6a, 6b, and 6f has been changed to "Esc", "F5", and "F9", respectively.

The CPU 2 determines whether to save the first key code information (step S313). As shown in FIG. 11, in the present exemplary embodiment, an item "Save Setup Key Bindings" is displayed in key binding list 8b on the BIOS setup screen displayed on display 8. In an example of FIG. 11, a color "Save Setup Key Bindings" is displayed in is inverted to indicate that this item is selected.

When this item is selected (Yes in step S313), CPU 2 stores the first key code change information in first storage 4 during the BIOS setup (step S314). When the first key code change information is stored in first storage 4, the asterisks attached to the first key code change information disappear as illustrated in FIG. 12. That is, the first key code change information is no longer highlighted. By storing the first key code change information in first storage 4, the first key code change information is used as new first key code information when electronic device 1 is activated next time. In a case where "Save Setup Key Bindings" is not selected (No in step S313), the first key code change information is not stored in first storage 4 during the BIOS setup, and the BIOS setup is exited (step S315). Further, also in a case where CPU 2 determines in step S309 that the first key code information and the second key code information have not been rewritten (No in step S309), the BIOS setup is exited (step S315).

When the BIOS setup is exited (step S315), CPU 2 determines whether or not to save the various parameters edited in the BIOS setup (step S316). In a case where the various parameters are saved (Yes in step S316), the changed set values are read from the second storage and written in first storage 4 by CPU 2 (step S317). At this time, when the first key code change information is already stored in first storage 4, various other parameters are stored in first storage 4. When the first key code change information has not been stored in first storage 4 during the BIOS setup, the first key code change information may be written in first storage 4 in step S317. After the various parameters are written in first storage 4, electronic device 1 is restarted.

When the various parameters are not saved (No in step S316), CPU 2 determines whether to restart electronic device 1 (step S318). When electronic device 1 is not restarted (No in step S318), the process proceeds to step S305 and the activation of the OS is started.

[Effects]

According to the exemplary embodiment described above, electronic device 1 can have two sets of key code information, namely, the first key code information for during the setup and the second key code information for during times other than during the setup. This makes it possible to assign different sets of functions to the operation buttons during the BIOS setup and during other times.

For example, "F10" is assigned to operation button 6a as the first key code information, and "F12" is assigned to operation button 6a as the second key code information. In this case, when operation button 6a is used before the BIOS setup is activated, the function "network boot" of "F12" can be performed. When operation button 6a is used during the BIOS setup, the function "save and exit" of "F10" can be performed. Since the function of "F12" is not used during the BIOS setup, the user operability can be improved by assigning key codes in such a manner.

In addition, since a plurality of functions can be assigned to one operation button, the number of operation buttons can be reduced while the operability is improved.

Although the invention of the present disclosure has been described above by taking the above exemplary embodiments as examples, the invention of the present disclosure is not limited to the above exemplary embodiments.

For example, in the above-described exemplary embodiments, electronic device 1 includes six operation buttons 6a to 6f. However, the number of operation buttons is not limited thereto, and there may be one or a plurality of operation buttons.

Further, in the above-described exemplary embodiments, electronic device 1 is a tablet PC. However, electronic device 1 may be, for example, a laptop PC, a smartphone, or the like.

The present disclosure can be widely applied to electronic devices having operation buttons.

What is claimed is:

1. An electronic device having an operation button, the electronic device comprising:
    a processor;
    a first storage that stores firmware to be executed by the processor when the electronic device is activated, and key code information that defines a function of the operation button;
    a second storage that reads the key code information from the first storage and temporarily stores the key code information in a rewritable manner; and
    a keyboard controller that assigns a key code to the operation button based on the key code information stored in the second storage,
    wherein
    the processor determines whether or not the key code information stored in the second storage has been rewritten during setup of the firmware,
    the processor generates key code change information for changing a key code assigned to the operation button when the processor determines that the key code information has been rewritten, and
    the keyboard controller changes the key code assigned to the operation button based on the key code change information during the setup of the firmware.

2. The electronic device according to claim 1, further comprising a display that displays a setup screen of the firmware,
    wherein the key code information and the key code change information are displayed on the display in a distinguishable manner.

3. The electronic device according to claim 2, wherein the key code change information is highlighted on the display.

4. The electronic device according to claim 1, wherein the processor stores the key code change information in the first storage.

5. The electronic device according to claim 1, wherein
    the key code information includes first key code information that defines a function of the operation button during the setup of the firmware, and second key code information that defines a function of the operation button during a time other than during the setup of the firmware,
    the keyboard controller changes a key code assigned to the operation button based on the second key code information when the electronic device is activated, and
    the keyboard controller changes the key code assigned to the operation button based on the first key code information when the setup of the firmware is started.

6. The electronic device according to claim 5, wherein
    the key code change information includes first key code change information generated when the first key code information is rewritten, and second key code change information generated when the second key code information is rewritten, and
    the processor stores the first key code change information in the first storage during the setup of the firmware, and stores the second key code change information in the first storage after the setup of the firmware is exited.

7. The electronic device according to claim 1, wherein the electronic device is a tablet personal computer (PC).

* * * * *